(12) United States Patent
Hunur et al.

(10) Patent No.: US 8,560,499 B2
(45) Date of Patent: Oct. 15, 2013

(54) DATA REDUCTION FOR OPTIMIZING AND TESTING

(75) Inventors: Nagaraj Hunur, Hyderabad (IN); Martin Hoyes, San Francisco, CA (US); Peter Murphy, West Greenwich, RI (US); Prasad Bodla, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 709 days.

(21) Appl. No.: 12/199,107

(22) Filed: Aug. 27, 2008

(65) Prior Publication Data

US 2009/0138467 A1    May 28, 2009

Related U.S. Application Data

(60) Provisional application No. 60/990,185, filed on Nov. 26, 2007.

(51) Int. Cl.
*G06F 7/00* (2006.01)
*G06F 17/00* (2006.01)

(52) U.S. Cl.
USPC .......................................... 707/637; 707/804

(58) Field of Classification Search
USPC .................... 707/637, 999.005, 804
See application file for complete search history.

(56) References Cited

U.S. PATENT DOCUMENTS

| | | | | |
|---|---|---|---|---|
| 5,946,692 | A * | 8/1999 | Faloutsos et al. | 707/999.001 |
| 7,191,181 | B2 * | 3/2007 | Chaudhuri et al. | 707/999.002 |
| 7,363,301 | B2 * | 4/2008 | Chaudhuri et al. | 707/999.003 |
| 2003/0061249 | A1 * | 3/2003 | Ramaswamy et al. | 708/136 |
| 2004/0249810 | A1 * | 12/2004 | Das et al. | 707/999.005 |
| 2007/0112869 | A1 * | 5/2007 | Gadiraju | 707/200 |
| 2007/0118573 | A1 * | 5/2007 | Gadiraju | 707/204 |
| 2008/0016014 | A1 * | 1/2008 | Sigal et al. | 706/15 |

* cited by examiner

*Primary Examiner* — Etienne LeRoux
*Assistant Examiner* — Bryan Walker
(74) *Attorney, Agent, or Firm* — Kilpatrick Townsend & Stockton LLP (57) ABSTRACT

A reasonably-sized testing database instance can be efficiently replicated and maintained for a very large production database while retaining the characteristics and cross-sectional data. The performance characteristics are maintained in order to provide for proper testing of the production database for various application programs. Statistics on the type of data distribution for the customer data are obtained, allowing for parameters to be determined which can be used to store data only near the endpoints of the distribution (and/or at other key locations). In this way, a substantial amount of data skew is retained in a much smaller instance of the production database, allowing for easier performance testing, upgrade testing, etc.

21 Claims, 6 Drawing Sheets

DATA REDUCTION FOR OPTIMIZING AND TESTING

CROSS-REFERENCES TO RELATED APPLICATIONS

This application is a non-provisional application and claims the benefit of and priority to co-pending, commonly assigned U.S. Patent Application No. 60/990,185 entitled "DATA REDUCTION FOR OPTIMIZING AND TESTING", filed on Nov. 26, 2007, the entire disclosure of which is herein incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Today, many large and medium sized companies have to manage vast amounts of data for an extended period of time. In one example, a company may maintain benefits data (insurance numbers, participants, social security numbers, account numbers, investments, portfolio value, etc.) for thousands of employees due to legal requirements or contractual obligations. In other examples, a different company may maintain purchasing and order data for millions of customers going back several years. Thus, for companies storing such voluminous data, it is necessary to operate and manage multi-terabyte databases.

These databases require great amounts of physical storage. The physical storage costs great sums of money to acquire, maintain, and operate. In some instances, a test database is also required to verify the function of different changes to the database or for other reasons. The test databases are a copy of at least a portion of the main database, also referred to as the production database. The test databases are also very costly to create because the test databases often require the same equipment and resources. Compounding the expense, companies generally need multiple copies of the main production database to test functionality of applications, performance of application programs, or upgrades to recent releases, for example. The several copies of the databases further increase the need for physical space to house the equipment and increase the associated costs. In extreme cases, the production databases are simply too large to obtain enough physical space to replicate and test the databases.

In general, companies try to replicate only a portion of the production database to minimize the costs associated with the test database. However, these test databases having a cross-section of the production database do not reasonably approximate the characteristics of a very large production database. For good test results, the performance characteristics are maintained for various application programs. For example, to test a benefits application, the test database needs to retain the historical distribution of benefits data for employees going back multiple enrollment cycles.

It is in light of these and other considerations that the present application is being presented.

SUMMARY

It is desirable to provide a test database which allows companies to reduce data storage costs and which can be easily and efficiently replicated and managed at a relatively low cost to those companies.

Embodiments presented herein provide a testing database instance, which is smaller than the database upon which the testing database is derived. In embodiments, statistics about a production database are gathered. Parameters to be extracted may be determined from the statistics, which can be used to store data only near the endpoints of the distribution (and/or at other key locations). In this way, a substantial amount of data skew is retained in a much smaller instance of the production database, allowing for easier performance testing, upgrade testing, etc. Using the statistics, the testing database is created. Thus, the testing database can be efficiently replicated and maintained for a very large production database while retaining the characteristics and cross-sectional data. In embodiments, the performance characteristics are maintained in order to provide for proper testing of the production database for various application programs.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments overcome the aforementioned and other deficiencies in existing database replication, maintenance, and/or testing systems. Embodiments provide for the replication of only those portions of the data necessary for testing and other such purposes which allows a smaller set of data to be maintained and utilized. The embodiments presented herein lowers cost and improves efficiency, while maintaining acceptable test accuracy and performance.

In embodiments, a database administrator (DBA) creates one or more copies of the production database. One or more of the production database copies can be purged using a purge program. A purge program can purge data according to a variety of parameters associated with the application. In embodiments, the purged information is not necessary for testing the application. The application is, in embodiments, a use or system that stores, retrieves, and uses the data in the production database. For example, if the data in the database represents benefits data, the application is a benefits application. In another example, a database storing ordering data is used by an ordering application. The parameters may be associated with how the application uses the data, statistics or characteristics that are important to the data and/or the application, what test is to be performed on the data, etc.

Embodiments of the purge program can purge data considering the data skew or performance characteristics of the production database. Hence, the test environment database better represents the function and structure of the production database. Thus, conducting performance tests on the copied instances yields similar or the same results as a test that could be performed on the production database—issues with upgrades or changes to the database can therefore be consistently reproducible.

Embodiments of the system described herein scale down the volume of the testing database while preserving the data that is primarily responsible for distribution and load issues. The system embodiments provide other advantages. Notably, the system is able to shrink the instance down, such as from multiple terabytes to a few hundred gigabytes and is able to ensure that index maintenance/backups are workable even on lower end machinery. Such an approach to reproducing the production database can preserve segment and tablespace level settings.

Figure 1:
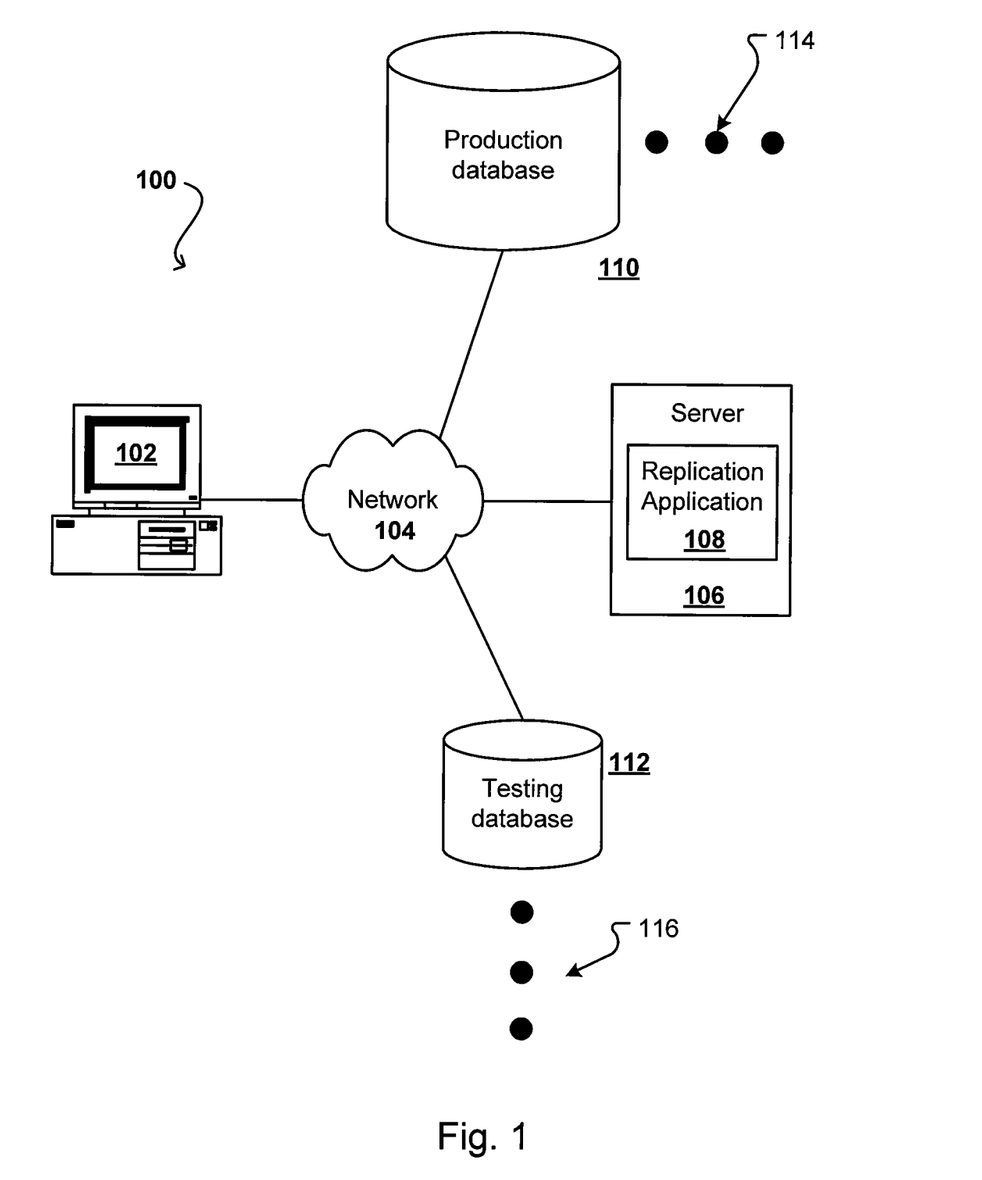
FIG. 1 is a block diagram of an embodiment of a system for creating testing database.

A block diagram of a system 100 that can generate a test database is shown in FIG. 1. A client device 102 is, in embodiments, hardware and/or software (for example, a personal computer or terminal) operable to accept inputs from or present information to a database administrator. The client device 102 can communicate with an appropriate server 106 via a network 104. The server 106 is hardware and/or software operable to communicate with the client device 102, interface with the database(s) 110 and/or 112, and/or execute the replication program 108. The network is, in embodiments, any hardware and/or software operable to allow communication between the one or more components of system 100. For example, the network is an intranet or the Internet.

A database replication program 108 can execute on the server 106. The replication program 108 is, in embodiments, a software program operable to extract data from a production database 110 and generate a testing database 112 from the production data. The production database 110 and/or testing database 112, in embodiments, is any hardware and/or software operable to store, retrieve, or execute actions on one or more items of data. The production database 110 and/or testing database 112 may be a relational database, a flat file, or other type of database. While in some instances the testing database 112 (or other instance of the production database) and production database 110 might have a common owner on a common network, in some embodiments, the production database 110 might be owned and maintained by a separate entity on a separate network from the testing database 112. In embodiments, there may be one or more production databases 110, as represented by the ellipses 114. Likewise, there can be one or more testing databases, as represented by ellipses 116. The one or more testing databases 112 may not be similar as each testing database 112 may different portions of the production database 112 created to analyze a particular application with predetermined and different parameters. The production database 110 and/or testing database 112 can include a number of distributed databases, a database system, data repositories, or any of a number of different ways to store and manage related data for an entity.

Figure 2:
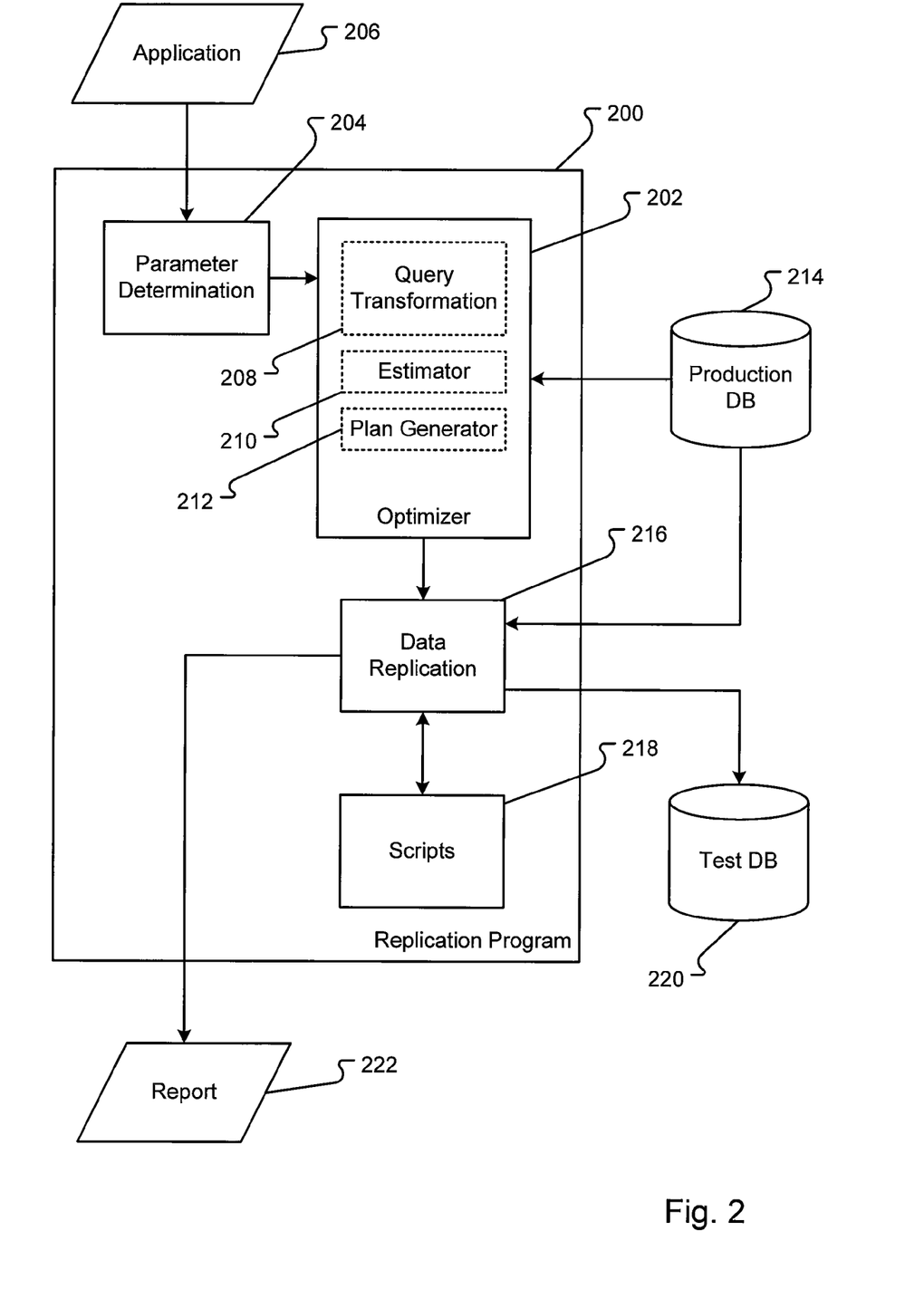
FIG. 2 is a block diagram of an embodiment of a software and/or hardware system for creating testing databases.

An embodiment of a replication program 200 is shown in FIG. 2. In embodiments, the replication program 200 is the same or similar to replication program 108 (FIG. 1). The replication program 200 comprises one or more components, which may be software modules, objects, or other software components. In other embodiments, the components are embodiments in hardware, for example, specially-designed circuitry in an application specific integrated circuit (ASIC) or field programmable gate array (FPGA).

In embodiments, the replication program 200 includes a parameter determination component 204. The parameter determination component 204 can support the input of an identity of one or more parameters associated with an application 206. The parameter determination component 204 can receive an identification of an application or process 206. In embodiments, the parameters are manually identified for the parameter determination component 204. In other embodiments, the parameter determination component 204 analyzes the application or process 206 with the associated production database 214 to determine the parameters. The parameter determination component 204 can provide the identities of one or more parameters to the optimizer component 202 to determine which parameters to extract from the production database 214 to create the test database 220.

In one embodiment, the application 200 includes, or makes calls into, an optimization application 202 (also referred to as the optimizer). In embodiments, the optimizer 202 determines a data distribution function. For example, the optimizer 202 is able to interpret data skew by examining the value endpoints of the production data 214 copied into the testing database 220. Data skew is the characteristic in a data set where the data does not appear as a normal curve but has more data at one end of the axis. An example of a data set having data skew is shown and explained in conjunction with FIG. 3. The optimization application 202 can preserve the high and low numeric/date/other value endpoints in order to keep the data skew intact. In embodiments, the optimization application 202 receives the identification of the main database from the parameter determination component 204 and intelligently uses the provided or determined parameters to clean up data in the test database 220, excluding the end points.

The optimizer 202 can comprise a set of query blocks, which include three main functional subsystems: a query transformation engine 208, an estimator 210, and a plan generator 212. The query transformation engine 208, in embodiments, identifying heuristics, or rules-based algorithms, to provide to the replication component 216 to apply to the query blocks to create the testing database 220. Some common transformations generated by the query transformation engine 208 include select-join, group-by, and distinct-view merging and materialized view rewrite.

An estimator 210 can determine a predicted "cost" of issuing one or more queries. For example, a cost model can include system statistics that predict central processing unit (CPU) cycles and/or input/output (I/O) usage with respect to the database system workload. In an example, the Oracle Database 10g predicts a default cost model for CPU plus I/O, in which the cost unit is time. The estimator 210 estimates execution time for a query by estimating the number of I/O operations, the type of I/O operations, and the number of CPU cycles the database will perform while executing the query. In embodiments, the estimates depend on the existence of system statistics in which the estimator 210 converts the number of CPU cycles and the number of I/Os into execution time. Some operations, such as bitmap merge, sort, or hash joins, may not require any I/O but generally all operations include some estimate of CPU cycles.

In embodiments, the query transformation component 208 and the estimator 210 inform the creation of the testing database 220. A plan generator component 212 creates a plan for creating the testing database 220. The plan generator 212 can determine which queries to run, how many queries to run, how to delete data retrieved, etc. The plan generator 212, in embodiments, provides the plan to the data replication component 216.

An example of an optimizer 202 (also referred to as the optimization program) is the optimizer contained in Oracle Database 10g, available from Oracle Corporation. The optimizer 202 can include a cost-based optimizer (CBO) component that has two modes: a "normal" mode and a tuning mode that is invoked by SQL Tuning Advisor (and many other Oracle Database 10g advisors, such as the SQL Access Advisor). The SQL Tuning Advisor is a tool for DBAs that invokes the tuning mode of the CBO to perform a more comprehensive analysis of problematic queries, and generates recommendations about how to achieve the fastest access to the data. One of the possible artifacts of this process is the generation of a SQL Profile, which is an object that can be persisted to the data dictionary if accepting the recommendation, and that is used by the CBO (i.e., during runtime operations in normal mode) to augment the statistics used to generate plans.

The replication program 200, in embodiments, can access scripts 218. Scripts 218 may be other programs, software modules, objects, algorithms, or other components that can analyze the production database 214 and/or the test database 220. The scripts 218 can determine the values for the parameters provided by the parameter determination component 204. The scripts 218 can provide details on the data distribution, value end points, and parameters.

The replication program 200, in embodiments, comprises a data replication component 216. In embodiments, the data replication component 216 receives the data distribution function from the optimizer 202. The data replication component 216 can extract data from the production database 214 in accordance with the data distribution function. The data replication component 216 can include the functions or component necessary to perform the queries provided by the optimizer 202, delete data from the replicated production database 214, store the testing database 220, etc. Thus, the data replication component 216 can create an instance of the production database 214. For example, when the data replication component 216 of the replication program 200 is run with a set of parameters for a benefits application, the result is an identification of persons whose benefits data needs to be deleted from the production database 214 to create the testing database 220. The data replication component 216 can be run multiple times with various parameters, resulting in deletion of data as required.

In embodiments, the end result of every run is a report 222. The report 222, in one embodiment, allows for monitoring of the replication process to ensure that value endpoints are being retained and data is being purged as expected. The data replication component 216 can utilize multiple threads to perform the task of deletion and, thus, is faster and more efficient.

The data replication component 216 deletes data, in one embodiment, by removing identifiers, such as "PersonIDs" and related information. For example, the data replication component 216 can delete benefits information for a benefits application where the benefits information is not involved in the first or last enrollment year, and with PersonIDs not being at the beginning or the end, numerically. Thus, the historical distribution of benefits data can be retained for a person going back years or multiple enrollment cycles. An example of such a benefits application is Oracle Advanced Benefits®, which is an integrated part of Oracle Human Capital Management® (HCM) component of the Oracle E-Business Suite® of applications, available from Oracle Corporation of Redwood Shores, Calif. Oracle Advanced Benefits® supports various aspects of benefits functionality, such as managing benefits information of employees, retirees, and their dependents and beneficiaries. Such an application also manages the costs incurred and the period for availing benefits.

Figure 3:
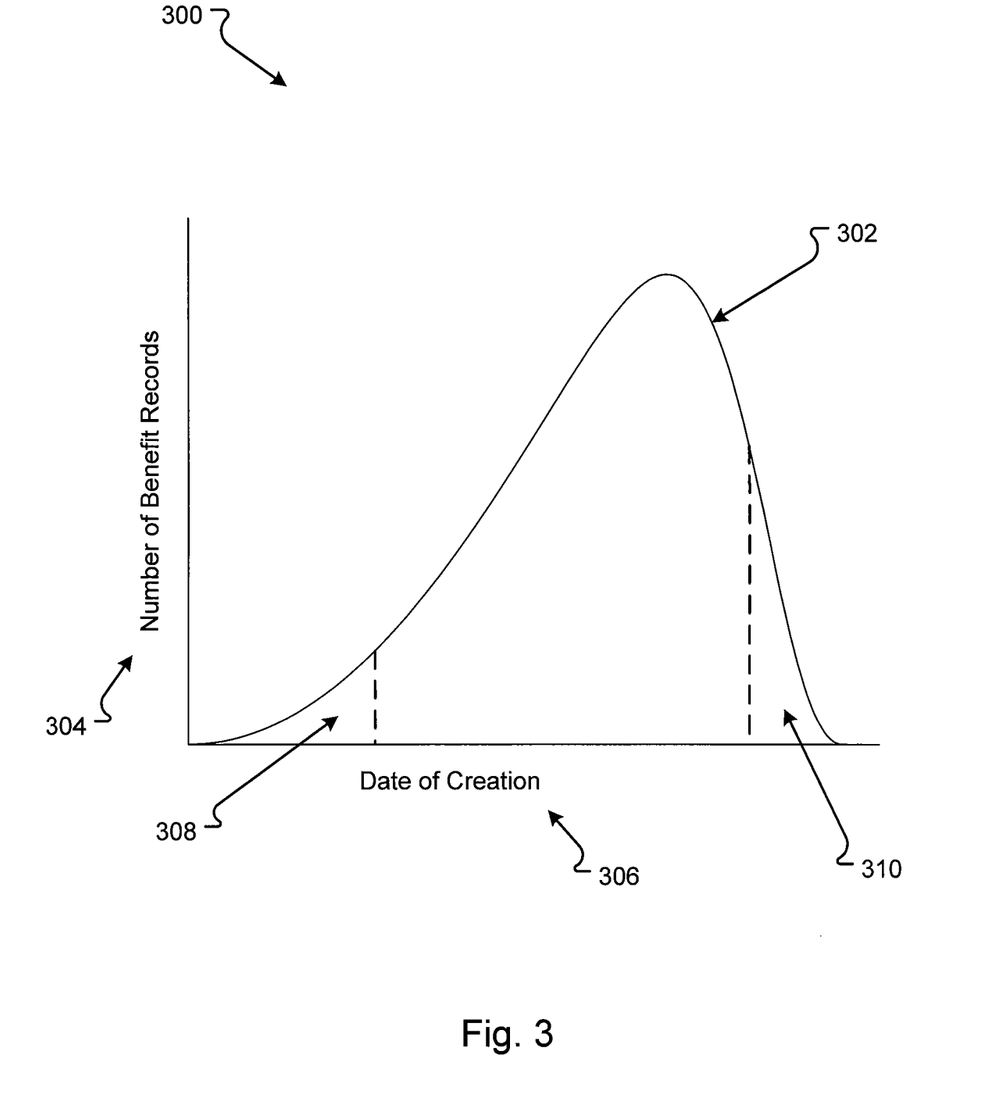
FIG. 3 is a graphical representation of a database having data skew.

A graphical representation of an example 300 of a production database 214 (FIG. 2) is shown in FIG. 3. The data 302 is shown having a date of creation for one or more records along the x-axis 306 and the number of records having the specific data of creation along the y-axis 304. As shown in the example, the data 302 has a skew as more data is further to the right of the x-axis 306. In one embodiment, the replication program 200 (FIG. 2) retains approximately 10% of the data at each endpoint, to maintain the skew in the production database 214 (FIG. 2). The data replication component 216 (FIG. 2) retains, for example, sections 308 and 310. Thus, the replication program 200 (FIG. 2) manages to purge 80-90% of original data in creating the testing database 220 (FIG. 2) while maintaining the original data skew as much as possible.

The resultant testing database 220 (FIG. 2) is much lighter than the production database 214 (FIG. 2) and easier to manage. The testing (or replicated) database 220 (FIG. 2) then can be used for various purposes, for example, obtaining a volume database from customers with similar performance characteristics. Such a light weight testing database 220 (FIG. 2) also can be used for performance testing and reproduction of performance issues, as well as to obtain performance metrics between major application releases or major functionality changes. A testing database 220 (FIG. 2) can also be used to measure in-house performance metrics, such as for upgrade acceptance. The replication program 200 (FIG. 2) can thus purge data intelligently resulting in smaller replicated databases with similar performance characteristics as the main database. These replicated databases 220 (FIG. 2) can be used to reproduce performance issues and are easier to maintain and run on lower end hardware.

Application teams (e.g., those groups of people that utilize the data for a function or purpose) can utilize copies of critical customer databases that are supported for functional or performance issues in smaller sizes than the actual databases, thus resulting in reduced disk costs and easier maintenance. Application teams can use these databases for performance benchmarking, such as to evaluate upgrades or test major functional changes, from a performance perspective, against customer data distributions.

Figure 4:
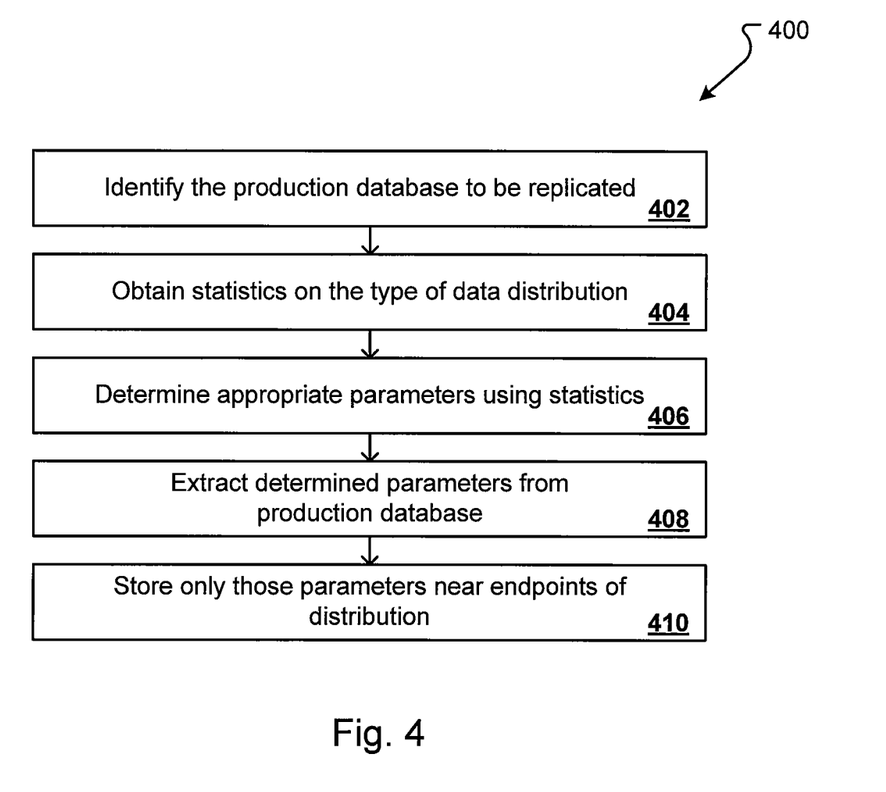
FIG. 4 is a flowchart illustrating a method for replicating data from a production database.

An example of a method 400 for creating a testing database is shown in FIG. 4. In embodiments, the method 400 is executed by the replication application 200 (FIG. 2), wherein the replication application 200 (FIG. 2) includes two separate programs (or two functional modules within the same program).

Identify operation 402 identifies the production database 214 (FIG. 2) to replicate. In embodiments, a user or administrator provides the identity of the production database 214 (FIG. 2) by providing a database identifier or providing some indication of the database. In other embodiments, the user provides an identity of the process or application program 206 (FIG. 2) to be executed and the replication program 200 determines the production database 214 (FIG. 2) by an association with the application program or process 206 (FIG. 2) provided by the replication program 200.

Obtain operation 404 obtains statistics on the data distribution. In embodiments, the replication program 200 (FIG. 2) analyzes the production database 214 (FIG. 2). The optimizer 202 (FIG. 2), in embodiments, obtains statistics on the type of data distribution for the data in the identified production database 214 (FIG. 2). Determine operation 406 determines the parameters to be used or provided. In embodiments, the replication program 200 (FIG. 2) determines the parameters to use to create the testing database 220 (FIG. 2). The optimizer 202 (FIG. 2) can provide the statistics to a plan generator 212 (FIG. 2) to determine parameters.

Extract operation 408 extracts the determined parameters from the production database 214 (FIG. 2). In embodiments, the optimizer 202 (FIG. 2) provides the parameters to a data replication component 216 (FIG. 2) to extract the parameters. The plan generator 212 (FIG. 2), in alternative embodiments, provides the data replication component 216 (FIG. 2) with a plan to extract the components. The data replication component 216 (FIG. 2) copies the data from the production database 214 (FIG. 2), and, in embodiments, the data replication component 216 (FIG. 2) stores only those necessary parameters to the testing database 220 (FIG. 2). In another embodiment, the data replication component 216 (FIG. 2) copies all the data from the production database 214 (FIG. 2) and then deletes one or more parameters from the testing database 220 (FIG. 2). The deletion of the appropriate data can shrink the size of the database. Store operation 410 stores the database. In embodiments, the data replication component 216 (FIG. 2) stores the testing database 220 (FIG. 2). In this way, the replication program 200 (FIG. 2) stores only parameters near the endpoints of the distribution in the testing database 220 (as described in conjunction with FIG. 3). A substantial amount of data skew is retained in a much smaller copy of the customer database. As discussed above, such an approach allows for easier performance testing, upgrade testing, etc., on the replicated databases. These processes can be used generically across whatever database product is used, with minimal, if any, coding changes.

The replication program 200 (FIG. 2) can examine the way that the customer database works technically rather than from an application and functional distribution perspective. An optimizer 202 (FIG. 2) can evaluate the production database 214 (FIG. 2) based on distribution statistics. In embodiments, an algorithm is used to preserve (in accordance with the distribution statistics for the optimizer 202 (FIG. 2)) a top and bottom portion of the distribution. Thus, the middle range of the data can be deleted, preserving the reproducibility of the customer data while significantly shrinking the size of the instance of the data. The top and bottom percentages are important because a lot of the issues faced by applications are due to a historical data distribution, including data stretching back over several years.

For other applications or distributions, the application may determine the amount to keep as necessary, which can be as little as 1% or 5%, or as much as 15% or 20% at each end. In other embodiments, the optimizer 202 (FIG. 2) may decide to keep a greater percentage near one of the endpoints. Other embodiments might look to other factors, such as determining which tables have the heaviest load and then looking at the distributions for those tables, or weighting those tables more when determining the data to be retained. Such factors may vary based on the application, as for certain applications problems tend to occur only on a certain type of table. The percentages to be kept also can be determined based in part on a capacity or load of the testing database 220 (FIG. 2).

SQL profiles use sampling to collect additional information; partial execution techniques to verify and adjust cost estimates; and execution history information for the SQL statement to modify parameter settings, if needed. In one embodiment, SQL queries (or other such queries) submitted to the database engine first run through a parser, which checks syntax and analyzes semantics. The result of this run-through is a set of query blocks that is sent to the optimizer 202 (FIG. 2).

In embodiments, two types of system statistics are gathered including statistics captured without a workload ("noworkload") and statistics captured with a workload. Noworkload statistics capture I/O system performance, including average I/O seek time and transfer speed, as well as CPU speed. When gathering noworkload statistics, the CBO issues sample reads of different sizes from the database's data files. The CBO times every read and then uses statistical methods to compute average seek time and transfer speed. This takes from a few seconds to a few minutes. The CBO computes CPU speed in millions of cycles per second. Workload statistics make the CBO aware of the workload. The system statistics captured during workload conditions identify whether the system is I/O- or CPU-bound, and the CBO uses the data to adjust the cost of the plans accordingly.

Figure 5:
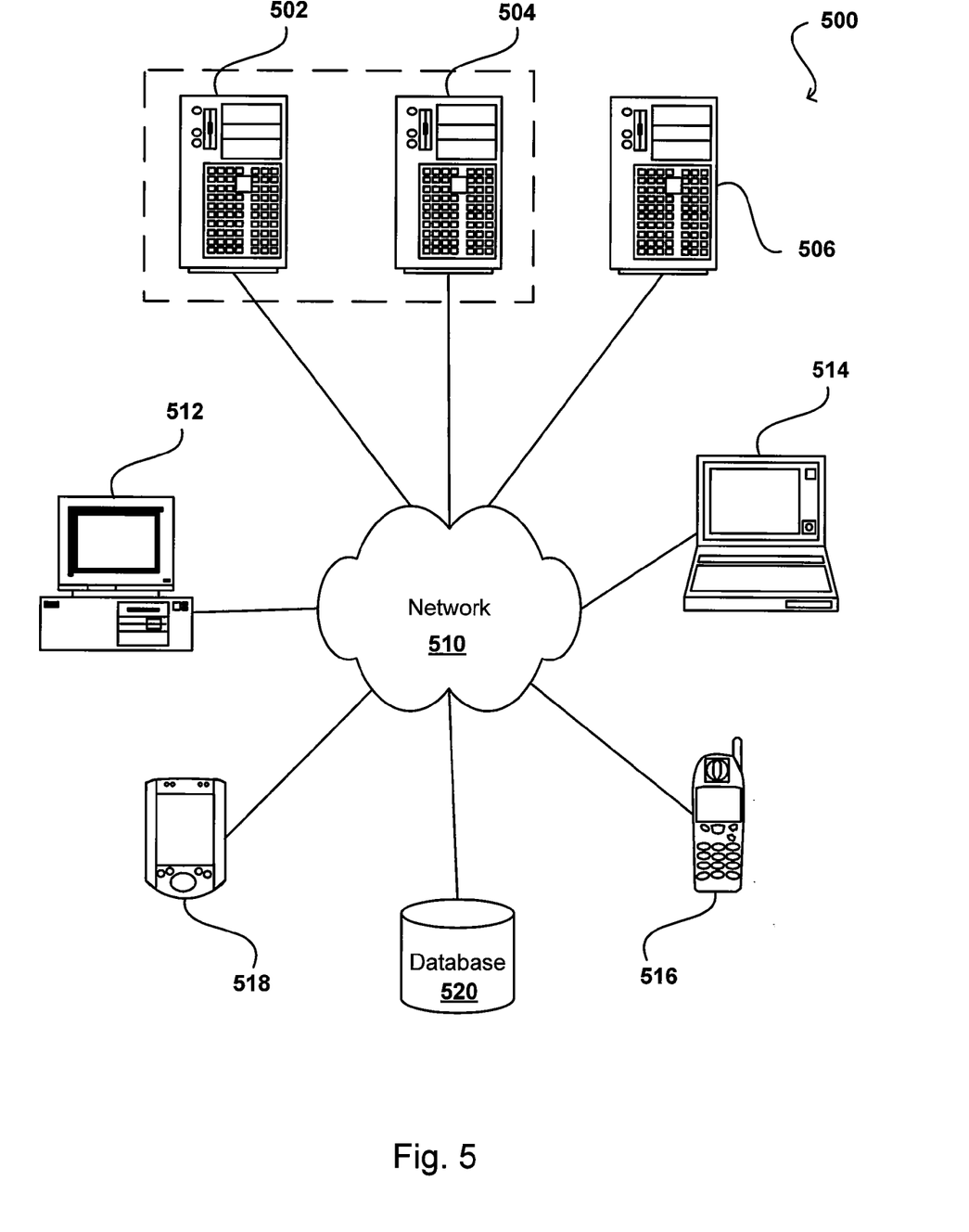
FIG. 5 is a block diagram of an embodiment of a computer network that can be used to replicate databases.

FIG. 5 is a block diagram illustrating components of an exemplary operating environment in which various embodiments of the present disclosure may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network(WAN); a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, WiMax, WiFi, CDMA 2000, WCDMA, the Bluetooth protocol known in the art, and/or any other wireless protocol); and/or any combination of these and/or other networks.

The system 500 may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers maybe used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, the database 520 may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
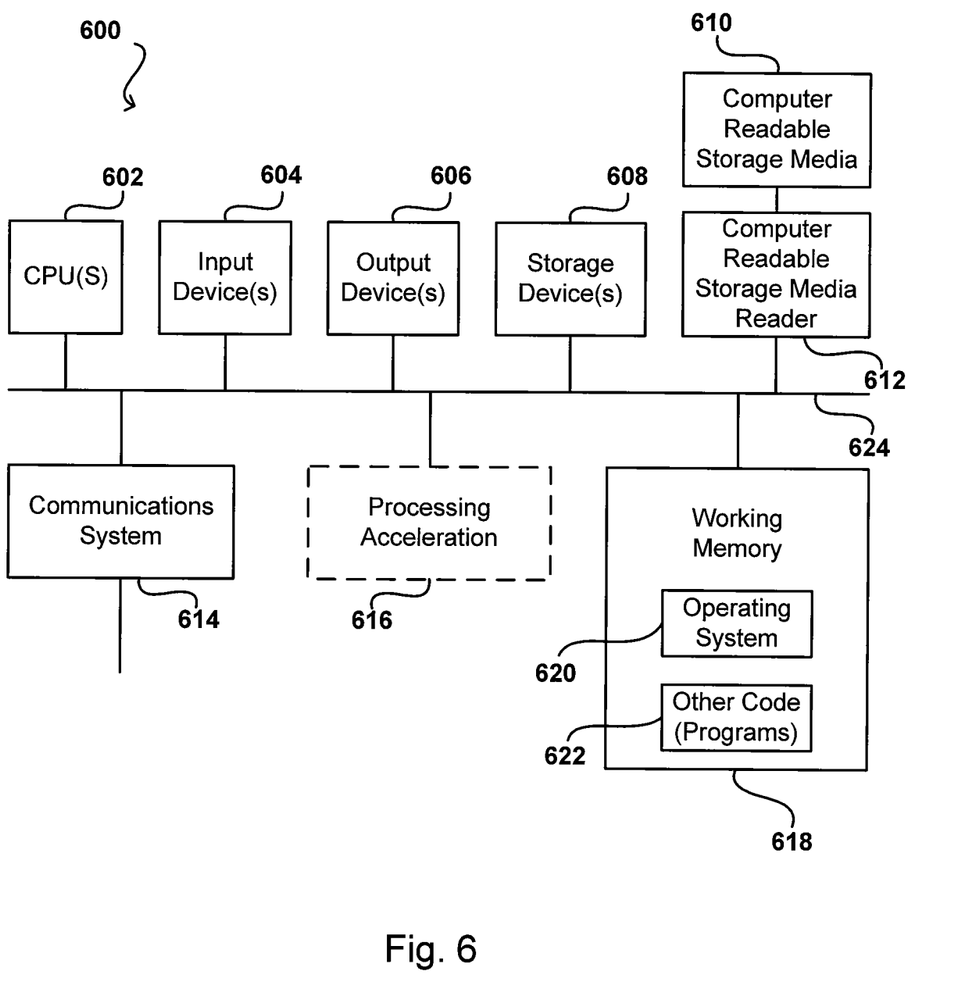
FIG. 6 is a block diagram of an embodiment of a computer system that can function in one or more embodiments to create a testing database.

FIG. 6 illustrates an exemplary computer system 600, in which various embodiments of the present disclosure may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor (DSP), a special-purpose processor, and/or the like.

The computer-readable storage media reader 612 can further be connected to a computer-readable storage media or medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method of creating a smaller instance of a database while substantially retaining data skew, comprising:
    identifying a main database for which a test process is to be executed wherein the test process tests an application and wherein the application uses the main database during execution;
    determining a data distribution function for the main database, the data distribution function being relevant to and based on the test process to be executed;
    determining identities of one or more parameters associated with the application;
    extracting parameters of the data distribution from the main database based on the determined identities of the one or more parameters; and
    creating a separate test instance of the main database using the extracted parameters and the determined data distribution function, wherein only the extracted parameters within a predetermined range of an endpoint of the distribution are stored to the separate test instance, such that the data skew of the main database is substantially maintained in the separate test instance based on the extracted parameters and the determined data distribution function relevant to the test process to be executed, the separate test instance being smaller than the main database but maintaining characteristics of the main database based on the maintained data skew.

2. The method as defined in claim 1, further comprising identifying the test process to be executed.

3. The method as defined in claim 2, wherein the main database is identified by an association with the identified test process.

4. The method as defined in claim 1, wherein the main database is identified by a provided identifier.

5. The method as defined in claim 1, further comprising analyzing the main database to obtain one or more statistics about the main database.

6. The method as defined in claim 5, wherein the data distribution is determined from the statistics.

7. The method of claim 1, wherein the test process is selected from a plurality of test processes, wherein each of the test processes test the application with different parameters, wherein each test process tests a different portion of the main database, and wherein the created test instance of the main database is different for each test process.

8. A computer system for creating a smaller instance of a database while substantially retaining data skew, comprising:
   a processor; and
   a memory device encoded with a replication program that causes the processor to execute:
   a parameter determination component, the parameter determination component operable to receive an identification of a test process to be executed, the parameter determination component operable to identify a main database associated with the test process to be executed wherein the test process tests an application, wherein the application uses the main database during execution, and wherein the determination component further determines identities of one or more parameters associated with the application;
   an optimizer, the optimizer operable to receive the identification of the main database from the parameter determination component, the optimizer operable to determine a data distribution function for the main database, the data distribution function being relevant to and based on the test process to be executed; and
   a data replication component, the data replication component operable to receive the data distribution function from the optimizer, the data replication component operable to extract parameters of the data distribution from the main database according to the data distribution function and the determined identities of the one or more parameters, the data replication component operable to create a separate test instance of the main database using the extracted parameters and the determined data distribution function, wherein only the extracted parameters within a predetermined range of an endpoint of the distribution are stored to the separate test instance, such that the data skew of the main database is substantially maintained in the separate test instance based on the extracted parameters and the determined data distribution function relevant to the test process to be executed, the separate test instance being smaller than the main database but maintaining performance characteristics of the main database based on the maintained data skew.

9. The computer system as defined in claim 8, wherein the optimizer comprises:
   an estimator, the estimator operable to determine a cost of one or more queries to the main database;
   a query transformation engine, the query transformation engine operable to identify heuristics or rules-based algorithms, the query transformation engine operable to provide the heuristics or rules-based algorithms to the data replication component; and
   a plan generator component, the plan generator component operable to determine which queries to run to extract parameters from the main database.

10. The computer system as defined in claim 9, the cost of the one or more queries is a function of the CPU cycle and the I/O operations.

11. The computer system as defined in claim 8, further comprising one or more scripts, the one or more scripts operable to be determine values for the parameters provided by the parameter determination component.

12. The computer system as defined in claim 8, wherein the data replication component stores the separate instance of the main database as a testing database.

13. The computer system as defined in claim 8, wherein the data replication component generates a report after extracting one or more parameters.

14. The computer system as defined in claim 8, wherein the data replication component executes a first extraction for one or more parameters and, after the first extraction, executes a second extraction of one or more other parameters.

15. The computer system as defined in claim 8, wherein the main database is a benefits database and wherein extraction of a parameter comprises deletion of one or more PersonIDs and related information.

16. A computer readable memory having stored thereon a sequence of instructions which, when executed by a processor, cause the processor to create a smaller instance of a database while substantially retaining performance characteristics of the database by:
   identifying a main database for which a test process is to be executed wherein the test process tests an application and wherein the application uses the main database during execution;
   determining a data distribution function for the main database, the data distribution function being relevant to and based on the test process to be executed;
   determining identities of one or more parameters associated with the application;
   extracting parameters of the data distribution from the main database based on the determined identities of the one or more parameters; and
   creating a separate instance of the main database using the extracted parameters and the determined data distribution function, wherein only the extracted parameters within a predetermined range of an endpoint of the distribution are stored to the separate instance, such that the data skew of the main database is substantially maintained in the separate instance based on the extracted parameters and the determined data distribution function relevant to the test process to be executed, the separate instance being smaller than the main database but maintaining the performance characteristics of the main database based on the maintained data skew of the main database for the test process to be executed.

17. The computer readable memory as defined in claim 16, further comprising instructions for identifying the test process to be executed.

18. The computer readable memory as defined in claim 17, further comprising instructions for identifying the main database by an association with the identified test process.

19. The computer readable memory as defined in claim 16, wherein the separate instance of the main database is a testing database, wherein the testing database has one or more portions of the main database deleted from the testing database.

20. The computer readable memory as defined in claim 16, further comprising analyzing the main database to obtain one or more statistics about the main database, wherein the one or more statistics are associated with the data skew.

21. The computer readable memory as defined in claim 20, wherein the data distribution is determined from the statistics.

* * * * *

UNITED STATES PATENT AND TRADEMARK OFFICE
CERTIFICATE OF CORRECTION

| | | |
|---|---|---|
| PATENT NO. | : 8,560,499 B2 | Page 1 of 1 |
| APPLICATION NO. | : 12/199107 | |
| DATED | : October 15, 2013 | |
| INVENTOR(S) | : Hunur et al. | |

It is certified that error appears in the above-identified patent and that said Letters Patent is hereby corrected as shown below:

In the Specification

Column 9, line 5, delete "maybe" and insert -- may be --, therefor.

Signed and Sealed this
Third Day of June, 2014

Michelle K. Lee
*Deputy Director of the United States Patent and Trademark Office*